United States Patent
Sekine et al.

[11] Patent Number: 5,850,394
[45] Date of Patent: Dec. 15, 1998

[54] CDMA COMMUNICATIONS SYSTEM USING MULTIPLEXED SIGNALING DATA LINES

[75] Inventors: Kiyoki Sekine; Toshio Kato; Manabu Kawabe; Takuro Sato, all of Tokyo, Japan

[73] Assignee: Oki Electric Industry Co., Ltd., Tokyo, Japan

[21] Appl. No.: 880,245

[22] Filed: Jun. 23, 1997

Related U.S. Application Data

[63] Continuation of Ser. No. 460,620, Jun. 2, 1995, abandoned.

[30] Foreign Application Priority Data

Jun. 10, 1994 [JP] Japan .................................... 6-127934

[51] Int. Cl.⁶ ...................................................... H04J 13/00
[52] U.S. Cl. .......................... 370/342; 370/320; 370/321; 375/205
[58] Field of Search .................................. 370/316, 320, 370/321, 342, 349, 347; 375/200, 205, 206, 202

[56] References Cited

U.S. PATENT DOCUMENTS

| | | | |
|---|---|---|---|
| 5,267,261 | 11/1993 | Blakeney, II et al. | 455/33.1 |
| 5,309,474 | 5/1994 | Gilhousen et al. | 455/33.1 |
| 5,313,457 | 5/1994 | Hostetter et al. | 370/320 |
| 5,313,461 | 5/1994 | Ahl et al. | 370/349 |
| 5,357,513 | 10/1994 | Kay et al. | 455/33.1 |
| 5,373,502 | 12/1994 | Turban | 370/19 |
| 5,375,140 | 12/1994 | Bustamante et al. | 370/18 |
| 5,467,367 | 11/1995 | Izumi et al. | 370/342 |
| 5,521,963 | 5/1996 | Shrader et al. | 455/33.1 |
| 5,555,258 | 9/1996 | Snelling et al. | 370/280 |
| 5,613,191 | 3/1997 | Hylton et al. | 370/342 |
| 5,619,525 | 4/1997 | Wiedeman et al. | 370/316 |

OTHER PUBLICATIONS

"Mobile Station–Base Station Compatibility Standard for Dual–Mode Wideband Spread Spectrum Cellular System", TIA/EIA/IS–95, (1993) Chapters 6 and 7.

*Primary Examiner*—Douglas W. Olms
*Assistant Examiner*—Shick Hom
*Attorney, Agent, or Firm*—Rabin & Champagne, P.C.

[57] ABSTRACT

A transmission device is disclosed in which user data are cross converted, at their base band, by the orthogonal transformers 31~34. Signaling data are collected at every integer which does not exceed the ratio of the user data to the signaling data and time division-like multiplexed by the multiplexer 20. The multiplexed data are crossly converted, at its base band, by the orthogonal transformer 35. The base band data cross converted by the orthogonal transformers 31~35 are added by the adder 40 and carrier modulated so as to be radio transmitted from the antenna 60.

3 Claims, 2 Drawing Sheets

5,850,394

CDMA COMMUNICATIONS SYSTEM USING MULTIPLEXED SIGNALING DATA LINES

This application is a continuation of application Ser. No. 08/460,620, filed Jun. 2, 1995, now abandoned.

REFERENCE TO THE RELATED APPLICATION

This application claims the priority right under 35 U.S.C 119, of Japanese Patent Application No. Hei 06-127934 filed on Jun. 10, 1994, the entire disclosure of which is incorporated herein by reference.

BACKGROUND OF THE INVENTION

1. Field of the Invention

The present invention relates to a transmission device, and more particularly to a transmission device, having an exclusive channel for multiplexed signaling data, applicable to a base station for mobile communication utilizing a communication system such as a personal communication system ("PCS"), a code division multiple access ("CDMA") system like a digital system, or the like.

2. Description of the Related Art

A CDMA communication system, in which user data are spread by a spread code having a wider frequency band than that of the user data and the spread data are transmitted as a base band transmission signal through a radio line, is disclosed for its technical concept, for example, in the following reference. "Mobile Station-Base Station Compatibility Standard for Dual-Mode Wideband Spread Spectrum Cellular System" TIA/EIA/IS-95.

There is disclosed in the reference a technology for transmission in which power control data are thinned out and time division-like transmitted on a communication channel, and signaling data are assigned to a frame of speech data. Under the above technology, 168 bit data region per one frame is divided into two sub-regions, a speech data region and a signaling data region, and data are transmitted separately from both sub-regions. A method of how data should be distributed is determined in view of a transmission rate of the speech data. The fundamental data transmission rate is 9,600 bits/sec and the data transmission is classified into five c, that is, speech data only, ½, 1/4 and ⅛ of speech data, and signaling data only. The speech data numbers vs. the signaling data numbers per one frame are, in each above classified transmission, as follows: 171/0, 80/88, 40/128, 16/152 and 0/168. The signaling data can be adjusted in length and transmitted in accordance with an amount of information by employing such a frame format.

However, the conventional transmission device has the following problems which are difficult to be solved.

(a) Since transmission is made by multiplexing the speech data and the signaling data on communication channels, the transmission speed of the speech data decreases.

(b) Each of the communication channels requires not only time division multiplexers but also control processors for assigning the signaling data and the speech data into the frame, which causes the hardware structure to be complicated and the scale of the device to be large.

(c) A device for detecting a voice is required so that the entire design and structure of the communication system becomes difficult.

SUMMARY OF THE INVENTION

It is, therefore, an object of the present invention to provide a transmission device enabling a transmission speed of user data to be kept high.

It is further object of the present invention to provide a transmission device which requires a time division multiplexer only for an exclusive channel for signaling data.

It is still further object of the present invention to provide a transmission device which does not require a control processor for assigning signaling data and speech data into a frame.

To accomplish the above objects, there is provided a transmission device for transmitting user data and signaling data concurrently from a base station to a plurality of mobile stations. The device includes a plurality of user data channels for transmitting the user data, at least one exclusive channel for transmitting the signaling data, and a multiplexer for multiplexing the signaling data so as to transmit them to the exclusive channel.

According to another aspect of the present invention, there is provided a transmission device for transmitting user data and signaling data concurrently from a base station to a plurality of mobile stations. The device includes a plurality of user data channels for transmitting the user data, at least one exclusive channel for transmitting the signaling data, a multiplexer for multiplexing the signaling data so as to transmit them to the exclusive channel, and a plurality of orthogonal transformers each connected either to the plurality of user data channels or to the exclusive channel.

According to the transmission device of the present invention, the signaling data, for example, corresponds to a signal for connection of the signal system for phone communication and the user data corresponds to speech data or the like of the phone communication. Since the amounts of signaling data and user data necessary to be transmitted varies independently of each other, each can be effectively transmitted or received if each is transceived independently. Accordingly, the transmission device according to the present invention sets, for example, one or a few exclusive channels for signaling data with a orthogonal code system such as Walsh code or the like independently from channels for user data. The signaling data for plural mobile stations are time division-like multiplexed by the multiplexer on the exclusive channels fox signaling data and communication will be made. The exclusive channel for signaling data serves to transmit the signaling data securely.

The maximum number of the mobile stations which utilize one exclusive channel for signaling data corresponds to an integer not to exceed the ratio of the user data to the signaling data.

BRIEF DESCRIPTION OF THE DRAWINGS

By way of example and to make the description more clear, reference is made to the accompanying drawings in which.

DETAILED DESCRIPTION OF THE PREFERRED EMBODIMENT

Now, a description will be made as to a transmission device according to the preferred embodiment of the present invention with reference to the attached drawings.

Figure 1:
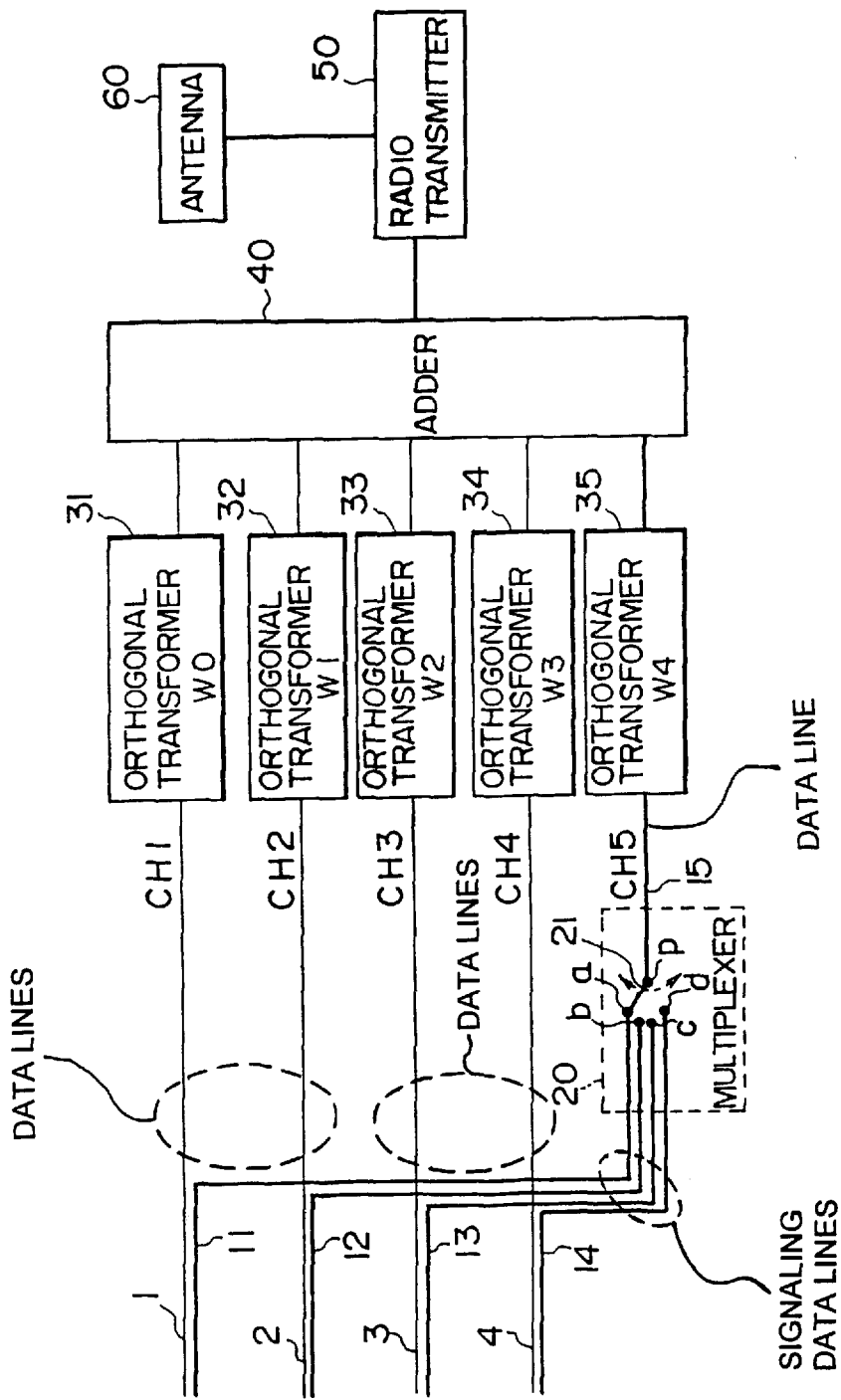
FIG. 1 is a block diagram illustrating a structure of a transmission device according to an embodiment of the present invention.

FIG. 1 is a view of the structure of the transmission device according to the embodiment used in a base station employing the CDMA communication system.

The transmission device possesses data lines 1–4 for plural user data channels CH1~CH4, and plural signaling data lines 11~14 for users. The signaling data lines 11~14 are connected, through a multiplexer 20, to a data line 15 for an exclusive channel CH5 for signaling data. The multiplexer 20, having installed therein a switch 21, is constructed such that connection contacts a, b, c and d of the respective signaling data lines 11~14 are sequentially connected to a connection contact p of the data line 15. The data lines 1~4 are connected to orthogonal transformers 31~34 respectively through the user data channels CH1~CH4. Further, the data line 15 is connected to a orthogonal transformer 35 through the exclusive channel CH5 for signaling data.

The output terminals of the orthogonal transformers 31~35 are connected to the input terminals of an adder 40, the output terminal of which is further connected to a radio transmitter 50. The radio transmitter 50 modulates the output signal of the adder 40 into a carrier frequency and transmits it from an antenna 60.

Figure 2:
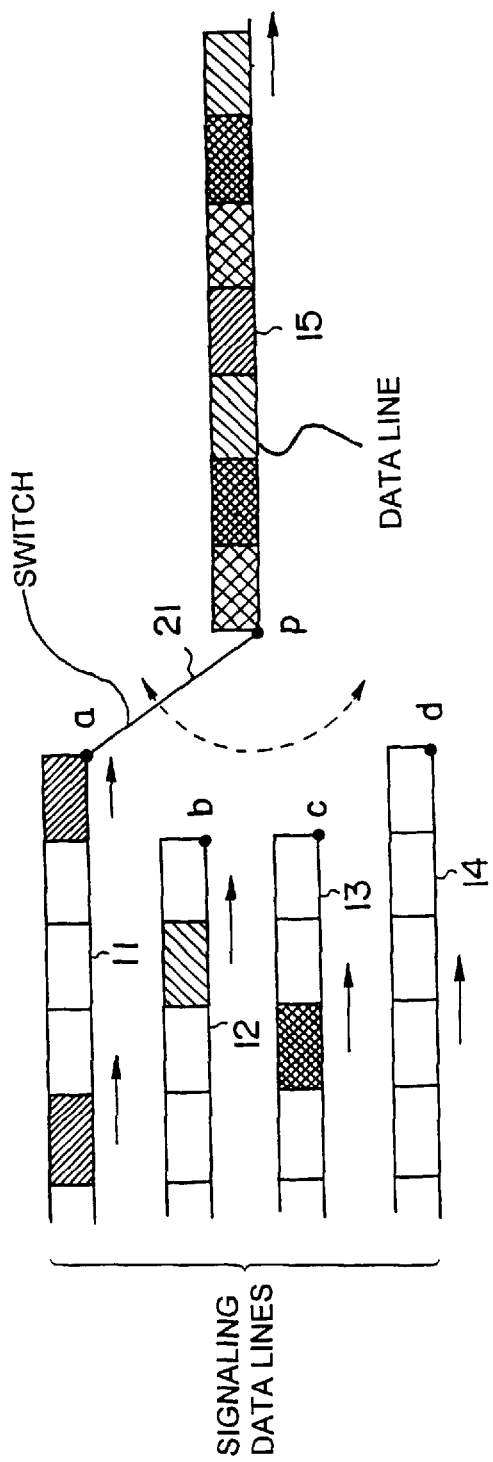
FIG. 2 is an explanatory view illustrating how signaling data are transmitted from the multiplexer shown in FIG. 1.

FIG. 2 is an explanatory view illustrating how the signaling data are transmitted from the multiplexer 20. FIG. 2 also shows how data multiplexing is performed in the multiplexer 20 connected to the exclusive channel CH5 for signaling data.

Now, a description will be made as to the operation of the transmission device shown in FIG. 1 with reference to FIG. 2. Assignments to each of the channels CH1~CH4, CH5 is made at the orthogonal transformers 31~35 by employing a cross code system {W0, W1, . . . }. The user data channels CH1~CH4 are respectively assigned to W0, W1, W2, W3 and the exclusive channel CH5 signaling data is assigned to W4. The user data are respectively transferred, through the data lines, to the orthogonal transformers 31~34 and cross converted, at their base band, by the orthogonal transformers 31~34. The cross conversion in the case of the CDMA communication like the present embodiment is made by employing the Walsh orthogonal code system or the like as a spread code.

On the other hand, the signaling data from users are transferred from the connection contacts a, b, c, d of the signaling data lines 11~14, through the switch 21 of the multiplexer 20, to the connection contact p of the data line 15 and multiplexed. In other words, the signaling data are collected at every integer which does not exceed the ratio of the user data to the signaling data and time division multiplexed by the multiplexer 20. The switch 21 of the multiplexer 20 successively changes over the connection contact p to the connection contacts a, b, c, d in this order in each frame intervals and transfers each of the signaling data to the exclusive channel CH5 for signaling data.

In FIG. 2, data synchronism is established on the signaling data lines 1~4 for users. However, such synchronism may be broken in an actual device. In such a case, data are stored in an unillustrated memory just before the data is transferred to each connection contacts a, b, c, d of the signaling data lines 1~4 and the data of every frame unit are transferred at the time of connection of the switch 21, thereby easily maintaining the synchronism for data output.

The multiplexed data that are time division-like multiplexed by the multiplexer 20 are cross converted by the orthogonal transformer 35, at their base band, in a similar manner to the user data.

The similar method applied to the user data channels CH1~CH4 is also applied for the cross conversion. The base band data cross converted by the orthogonal transformers 31~35 are added by the adder 40 and radio transmitted from the antenna 60 after being modulated by the radio transmitter 50 at a carrier frequency.

If the number of mobile stations connected to the base station does not correspond to the number assigned to the exclusive channel CH5, intermittent transmission that transmits data with a constant interval is made. To improve the quality of communication, it is possible to transmit data repeatedly during the intermittent transmission interval.

When the radio-transmission is made by the transmission device, line connection from the exclusive channel for signaling data is changed over in every constant interval by an unillustrated receiver to obtain the signaling data necessary for the receiver so as to receive the user data.

As described above, the transmission device according to the present embodiment has the following advantages as compared to the conventional transmission device. The conventional transmission device requires a multiplexer for all channels since the signaling data are time division-like inserted in each user data of each channels.

To the contrary, the transmission device according to the present embodiment is constructed such that the necessary number of the multiplexer 20 is the same number of the exclusive channel CH5 for signaling data. Furthermore, it eliminates a processor for control which constitutes a frame format and assigns the signaling data and the speech data into the frame, which contributes to simplification of the hardware structure and miniaturization of the size of the transmission device. Further, the structure of the transmission device does not depend on a voice detection device, so that the design and structure of the entire communication system can be facilitated.

It is to be noted that the present invention is not limited to the above embodiment.

Although the transmission device shown in FIG. 1 possesses four data transmission channels CH1~CH4 and one exclusive channel CH5 for signaling data, these numbers of channels are optional and the invention is not limited to these numbers.

What is claimed is:

1. A transmission device for transmitting user data and signaling data concurrently, from a base station to a plurality of mobile stations, the device comprising:

a plurality of user data channels over which user data may be transmitted, wherein each of the plurality of user data channels corresponds to a respective one of the plurality of mobile stations;

a plurality of signaling data channels over which signaling data may be transmitted, wherein each of the plurality of signaling data channels corresponds to a respective one of the plurality of user data channels; and a multiplexer, disposed to receive the plurality of signaling data channels, for time division multiplexing the signaling data transmitted over the plurality of signaling data channels to provide signaling output data on an exclusive signaling data output channel corresponding to a respective one of the plurality of user data channels.

2. The transmission device of claim 1, further comprising a plurality of spread encoders, each corresponding to a respective one of the user data channels and the signaling data output channel, for spread encoding the user data and the signaling output data, wherein each of the plurality of spread encoders uses a different spread code.

3. The transmission device of claim 2, further comprising an adder for adding the spread encoded user data and signaling output data.

* * * * *